United States Patent [19]

Dey

[11] 4,060,673

[45] Nov. 29, 1977

[54] ION EXCHANGE MEMBRANES AND ORGANIC ELECTROLYTE CELLS EMPLOYING SAME

[75] Inventor: Arabinda N. Dey, Needham, Mass.

[73] Assignee: P. R. Mallory & Co. Inc., Indianapolis, Ind.

[21] Appl. No.: 396,924

[22] Filed: Sept. 13, 1973

Related U.S. Application Data

[63] Continuation-in-part of Ser. No. 817,150, April 7, 1969, abandoned, which is a continuation-in-part of Ser. No. 313,300, Dec. 8, 1972, abandoned.

[51] Int. Cl.² .............................................. H01M 6/18
[52] U.S. Cl. .................................... 429/192; 429/194; 429/254
[58] Field of Search ............ 136/146, 153, 154, 6 LN; 204/296, 180 P; 260/2.1; 429/192, 194, 254

[56] References Cited

U.S. PATENT DOCUMENTS

| | | | |
|---|---|---|---|
| 3,297,595 | 1/1967 | Mindick et al. | 136/146 X |
| 3,531,328 | 9/1970 | Bro et al. | 136/146 X |
| 3,532,543 | 10/1970 | Nole | 136/6 LN |
| 3,684,580 | 8/1972 | Lysaght | 136/146 |

*Primary Examiner*—Winston A. Douglas
*Assistant Examiner*—John F. Niebling
*Attorney, Agent, or Firm*—Ronald S. Cornell; Israel Nissenbaum; C. W. Hoffmann

[57] ABSTRACT

Ion exchange membranes adapted for use in organic solvents. The membranes include a substrate providing microporosity and a polyelectrolyte supported thereby and comprised of Na, K, or Li salts of linear polymers having attached functional groups. The disclosure pertains further to organic electric cells which employ the membranes as cell separators. Other features of the invention appear in the specification.

16 Claims, No Drawings

ION EXCHANGE MEMBRANES AND ORGANIC ELECTROLYTE CELLS EMPLOYING SAME

This is a continuation-in-part of U.S. Ser. No. 817,150, filed Apr. 7, 1969 now abandoned, and U.S. Ser. No. 313,300, filed Dec. 8, 1972 now abandoned.

This invention relates to ion exchange membranes and more particularly to ion exchange membranes adapted for use in organic electrolyte systems.

In copending applications, Ser. Nos. 775,444 and 775,487, assigned to common assignee, there are disclosed high energy density cells comprised of a light metal anode, a cathode the active material of which is sulfur or a metal halide, an organic electrolyte and an ion exchange membrane interposed between the cell cathode and electrolyte. In these applications, the ion exchange membrane has a microporous structure sufficient to reduce free electrolyte flow to a negligible rate and has the further characteristic of permselectivity for electrostatically retarding migration of certain cell ions to prevent self discharge of the cell.

The ion exchange membranes in these cells are commercially available membranes designed for use in aqueous systems. In general, such membranes are comprised of an organic network or backbone which has attached thereto functional groups which may be cationic, anionic or in some cases amphoteric. The membranes include a requisite counter ion which is loosely bound in the membrane and capable of ready egress into the associated electrolyte to establish the Donnan potential difference between the membrane and the electrolyte, a prime prerequisite for permselectivity.

The organic network of these commercially available membranes is formed by the cross-linking of polyelectrolytes, e.g. polystyrene resin cross-linked by divinylbenzene. Such cross-linking is essential to render the polyelectrolyte insoluble in aqueous mediums. In this process of insolubilizing the polyelectrolyte, the cross-linking agent is effective to bring into existence a three-dimensional network which is not oxidizable or reducible and which has sufficient elasticity for ease in mechanical handling. The degree of cross-linking is directly related to the percent of cross-linking agent employed and is effective to control the interior dimensioning of the network to create a membrane of desired microporosity. The functional groups are generally attached to the network by sulfonation or carboxylation thereof to form a cationic membrane or by amination thereof to form an anionic membrane.

Membrane chemical properties are measured primarily by what is termed ion exchange capacity, i.e. the ratio of ionic groups in the membrane to the unit volume or weight of the membrane, expressed as equivalents/cc or equivalents/gms. A high exchange capacity is particualrly desired in the membrane for efficient ion separation. In the commercially available membranes the exchange capacity is generally less than 6.0 equivalents per gram.

Applicant has observed cross-linking to be a major limitation on the exchange capacity of a membrane since this method of insolubilizing is effective to increase the molecular weight of the polyelectrolyte and to add a significant third dimension to the formed membrane. Since the number of functional groups attachable to a given mass of polyelectrolyte is not increased with cross-linking thereof, increases in volume or mass thereof serve only to degrade ion exchange capacity. As the degree of cross-linking is increased, ion exchange capacity decreases accordingly.

When commercially available membranes designed for use in aqueous mediums are employed in organic electrolytes a further decrease in ion exchange capacity in the order of 50% has been noted to occur. Such membranes also have been found to exhibit relatively high specific resistance. This characteristic is undesirable in the specific application of the membrane to electric cells where high internal cell power consumption is to be avoided.

In the above-referenced applications, commercially available ion exchange membranes have been found to reduce self-discharge of organic electrolyte cells. However, since these membranes are designed primarily for use in solvents of a different nature from the solvents of these cells, cell self-discharge is not as effectively retarded as would be the case were these membranes not to exhibit initially limited ion exchange capacity and further reductions therein in organic electrolytes.

It is an object of the present invention to provide ion exchange membranes particularly adapted for use in organic systems.

It is a further object of the invention to provide ion exchange membranes having high ion exchange capacity.

It is an additional object of the invention to provide ion exchange membranes of low specific resistance.

It is also an object of this invention to provide electric cells employing ion exchange membranes particularly adapted for use in the organic electrolytes thereof.

These objectives are attained in the present invention by a novel ion exchange membrane comprising a microporous substrate and a polyelectrolyte comprised of a Na, K, or Li salt of a linear polymer having attached functional groups. The membrane is produced without cross-linking of the polyelectrolyte, thereby permitting improved ion exchange capacity in the order of twice that of presently available membranes. Since the membrane is designated primarily for use in organic electrolytes, all linear polymers having characteristic insolubility in organic solvents are employable despite that they are water soluble.

In accordance with the invention ion exchange membranes for use in organic systems have been produced with ion exchange capacities of twelve milli-equivalents/gm, said capacity being maintained when said membranes are disposed in organic solvents.

Ion exchange membranes made in accordance with the invention have been found to be particularly suitable for use in electric cells having organic electrolytes. In this regard, the membranes of the invention have exhibited specific resistivities markedly reduced from those of commercially available membranes, thus reducing internal cell losses.

The foregoing and other objects and features of the invention will be evident from the following detailed description of the invention.

In the present invention, applicant has determined that the requisite characteristics of ion exchange membranes, i.e. microporosity and permselectivity, may be treated separately when the end use of the membrane is a non-aqueous system. Thus, microporosity is provided in the subject membranes by the use of a substrate which is completely independent of the membrane polyelectrolyte, said substrate being microporous in nature. Various materials are suitable for this purpose, for example, polyethylene, filter paper, etc.

In addition to its function of retarding ion transfer across the membrane by physically impeding movement ions of certain sizes, the membrane substrate functions as a carrier of the electrostatically operative membrane portion.

This portion of the membrane is constituted by Na, Li, or K salts of specific polyelectrolytes having attached functional groups. The polymer of the polyelectrolyte is a linear polymer which is insoluble in the organic solvent for which the membrane is intended to be used. Cross-linking to provide water-insolubilization of the polymer heretofore customary in ion exchange membrane preparation, is not required in view of this intended use. In view of the provision of the membrane substrate, cross-linking is also unnecessary for its other prior purpose, that of forming a microporous organic backbone for the membrane.

The linear polyelectrolytes suitable for use in the preparation of ion exchange membranes of cationic nature are the Na, K, and Li polyacrylates and the Na, K, and Li salts of linear polystyrene sulfonate. Typically, sulfonation and carboxylation of the polymer is effective to attach functional groups supporting the membrane counter cation.

Furthermore, it is desirable to use high molecular weight polyelectrolytes such that the average molecular weight thereof is greater than $10^4$.

In a particular example of the preparation of a cationic ion exchange membrane in accordance with the invention, the highly water-soluble polyelectrolyte, potassium polyacrylate is used. The polyelectrolyte is formed by polymerizing acrylic acid, using benzoyl peroxide as a catalyst, and subsequently neutralizing it with potassium hydroxide.

The disclosed polyelectrolytes (i.e. Na, K, or Li salts of polystyrene sulfonates or polyacrylates) are insoluble in the following organic solvents: gamma-butyrolactone, acetone, propylenecarbonate, tetrahydrofuran, dimethylformamide, dimethylsulfoxide, dimethylcarbonate, acetonitrile, and the mixtures thereof.

The membrane substrate selected may be filter paper and a concentrated aqueous solution of potassium polyacrylate is applied thereto. The soaked filter paper is next treated with excess acetone. The potassium polyacrylate forms a sticky layer on the filter paper which is dried and then kept in gamma-butyrolactone overnight. The resulting membrane is flexible.

In the above referenced copending applications, there are disclosed electric cells having ion exchange membranes as cell separators. The cell anions comprise polysulfides or chlorocuprate complexes highly soluble in the cell organic solvent, where the active cathode materials are sulfur or metal halides, respectively. The anions are present in the cell electrolyte by reason of the solubility of cathodic discharge products in the case of sulfur and by reason of the solubility of the active cathode material in the case of the metal halides. Light metal anodes, such as lithium, are employed in the cells.

While in these cells, membranes heretofore available, while serving to inhibit to some extent migration or diffusion of cell anions which promote cell self-discharge, did not substantially prevent such migration and did not extend shelf life to the most desirable extent.

The membranes of the present invention have been found particularly and unexpectedly effective in retarding diffusion of such anions. For example, a membrane prepared as outlined above, comprising potassium polyacrylate and filter paper, was used to separate the solutions in which such diffusion was known to occur. On one side of the membrane, was a one molar solution of $LiCuCl_3$ in gamma-butyrolactone. On the other side of the membrane was placed a one molar solution of LiCl in gamma-butyrolactone. After a period of forty-five days, examination of the LiCl solution indicated that no diffusion thereinto of the chlorocuprate complex ion ($CuCl_3^-$) occurred.

Ion exchange capacity determinations performed on membranes made in accordance with the invention indicate a capacity of twelve milli-equivalents/gm or twice that of presently available membranes.

In connection with the particular application of ion exchange membranes as separators for organic electrolyte cells, measurements of the specific resistance of the membranes of the invention and commercially available membranes were made. It was found that the membranes of the invention have a specific resistance of $1.0 \times 10^5$ ohm-cm., whereas membranes heretofore known to provide optimum containment of cell anions exhibit a specific resistance in the order of $5.7 \times 10^6$ ohm-cm. Since internal cell losses give rise to reduced cell output voltage and decreased useful power, it will be evident that the membranes of this invention having a specific resistivity reduced by a factor of almost sixty, have particularly desirable electrical characteristics in addition to the previously discussed superior electrostatic characteristics.

It will thus be seen that the objects set forth above, among those made apparent from the preceding description, are efficiently attained. Since certain changes may be made in the disclosed membrane without departing from the scope of the invention, it is intended that all matter contained in the above description shall be interpreted as illustrative and not in a limiting sense.

What is claimed is:

1. In an organic electrolyte battery having a light metal anode, a cathode selected from the group consisting of metal halides and sulfur, and an organic electrolyte selected from the group consisting of gamma-butyrolactone, propylene carbonate, tetrahydrofuran, dimethylformamide, dimethylsulfoxide, dimethylcarbonate, acetonitrile, and the mixtures thereof, and containing an electrolyte salt dissolved therein, a microporous permselective barrier means therefor, separating said cathode and said electrolyte, and adapted to prevent diffusion of electrolytic anions, said barrier means comprising an ion-exchange membrane including a microporous substrate and a linear polyelectrolyte without cross-linking, said polyelectrolyte comprising a polymer insoluble in said organic solvent and having attached functional groups, said polyelectrolyte selected from the group consisting of Li, Na, and K polyacrylates.

2. The organic electrolyte battery of claim 1 wherein said substrate of said ion-exchange membrane is paper.

3. The organic electrolyte battery of claim 1 wherein said anode is lithium.

4. The organic electrolyte battery of claim 1 wherein the average minimum molecular weight of said linear polyelectrolyte is $10^4$.

5. In an organic electrolyte battery having a light metal anode, a cathode selected from the group consisting of metal halides and sulfur, and an organic electrolyte selected from the group consisting of gamma-butyrolactone, propylene carbonate, tetrahydrofuran, dimethylformamide, dimethylsulfoxide, dimethylcarbonate, acetonitrile, and the mixtures thereof, and containing an electrolyte salt dissolved therein, a microporous permselective barrier means therefor, separating said cathode and said electrolyte, and adapted to prevent diffusion of electrolytic anions, said barrier means comprising an ion-exchange membrane including a microporous substrate and a linear polyelectrolyte without cross-linking, said polyelectrolyte comprising a polymer insoluble in said organic solvent and having attached functional groups, said polyelectrolyte selected from the group consisting of Li, Na, and K salts of polystyrene sulfonate.

6. The organic electrolyte battery of claim 5 wherein said substrate of said ion-exchange membrane is paper.

7. The organic electrolyte battery of claim 5 wherein said anode is lithium.

8. The organic electrolyte battery of claim 5 wherein the average minimum molecular weight of said linear polyelectrolyte is $10^4$.

9. An organic electrolyte cell comprising a light metal anode; an organic electrolyte selected from the group consisting of gamma-butyrolactone, propylene carbonate, tetrahydrofuran, dimethylformamide, dimethylsulfoxide, dimethylcarbonate, acetonitrile, and the mixtures thereof; a cathode, the active material of which produces in said electrolyte anions whose diffusion causes self-discharge, and a microporous permselective barrier means separating said cathode and said electrolyte and adapted to prevent said diffusion, said barrier means comprising an ion exchange membrane consisting of a microporous substrate and a linear polyelectrolyte without cross-linking, said linear polyelectrolyte consisting of a water-soluble polymer, insoluble in the organic solvent of said electrolyte and having attached functional groups, said polyelectrolyte selected from the group consisting of Li, Na, and K polyacrylates.

10. The organic electrolyte battery of claim 9 wherein said substrate of said ion exchange membrane is paper.

11. The organic electrolyte battery of claim 9 wherein said anode is lithium.

12. The organic electrolyte battery of claim 9 wherein the average minimum molecular weight of said linear polyelectrolyte is $10^4$.

13. An organic electrolyte cell comprising a light metal anode; an organic electrolyte selected from the group consisting of gamma-butyrolactone, propylene carbonate, tetrahydrofuran, dimethylformamide, dimethylsulfoxide, dimethylcarbonate, acetonitrile, and the mixtures thereof; a cathode the active material of which produces in said electrolyte anions whose diffusion causes self-discharge, and a microporous permselective barrier means separating said cathode and said electrolyte and adapted to prevent said diffusion, said barrier means comprising an ion exchange membrane consisting of a microporous substrate and a linear polyelectrolyte wtihout cross-linking, said linear polyelectrolyte consisting of a water-soluble polymer, insoluble in the organic solvent of said electrolyte and having attached functional groups, said polyelectrolyte selected from the group consisting of the Li, Na, and K salts of polystyrene sulfonate.

14. The organic electrolyte battery of claim 13 wherein said substrate of said ion exchange membrane is paper.

15. The organic electrolyte battery of claim 13 wherein said anode is lithium.

16. The organic electrolyte battery of claim 13 wherein the average minimum molecular weight of said linear polyelectrolyte is $10^4$.

* * * * *